Feb. 10, 1931. W. A. FRANKE 1,792,157
AUTOMOBILE BUMPER
Filed Aug. 9, 1930
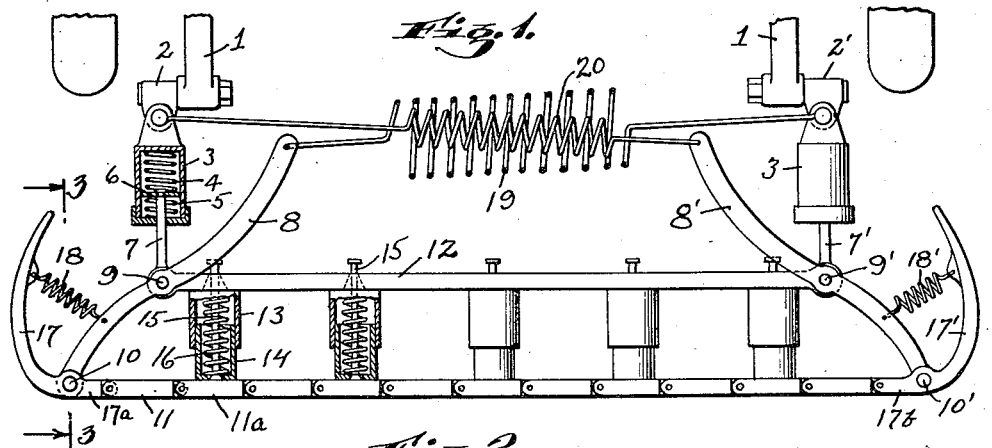
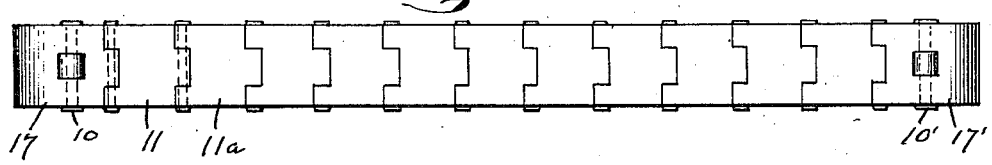
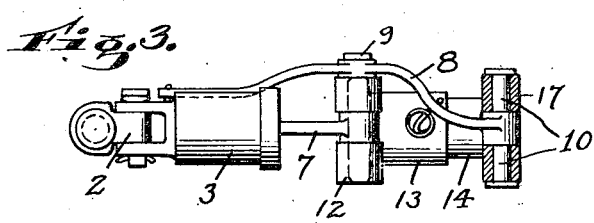
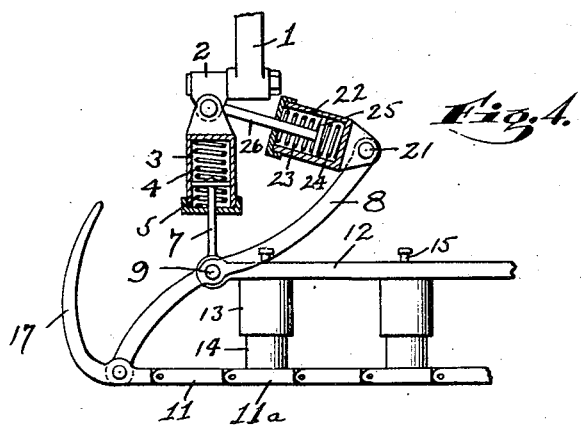
INVENTOR,
William A. Franke,
BY
Lewis J. Doolittle,
ATTORNEYS.

Patented Feb. 10, 1931

1,792,157

UNITED STATES PATENT OFFICE

WILLIAM A. FRANKE, OF NEW YORK, N. Y.

AUTOMOBILE BUMPER

Application filed August 9, 1930. Serial No. 474,083.

The object of the present invention is to provide an automobile bumper which shall be yielding in various directions and which shall, at the same time, provide protection to the car and also avoid serious injury to a person struck by the same, or unnecessary damage to another car in case of a collision.

In carrying out the objects of the invention, I provide a novel construction and arrangement of parts which will function efficiently and which comprises an impact member composed of a number of separate members hinged together and extending between supports at either end thereof, which supports are yieldingly mounted upon cushioning means adapted to be attached to the body or frame of the automobile. To supplement the operation of the impact member, resilient means may also be provided to place the impact member under tension and also to take up a part of the yielding, or resist the excessive yielding of the same due to an impact in a collision and to provide a cushioning action supplementing the action of the impact member. Yielding members may also be provided at the sides of the device to resist any impact from the side, all of which will appear more fully hereinafter in connection with the description of the device shown in the drawings as illustrative of my invention.

In the drawings, like parts in the several views have been given the same reference numeral.

Fig. 1 is a plan view, partly in section, illustrating one form of a bumper in position on the car frame; Fig. 2 is a front view of the impact member shown in Fig. 1; Fig. 3 is a detail side view, partly in section on the line 3—3 of Fig. 1; Fig. 4 is a plan view of one end of a modified construction for the bumper mounting.

The forward portion of the frame of an automobile is indicated at 1, to which shackles, 2—2', are attached for carrying the bumper. These are shown as conventional means for attaching the bumper to the car and will be constructed to meet the requirements in each case, as will be understood.

In the form shown in Figs. 1, 2 and 3, cushioning means are shown as comprising a casing 3 in which springs 4 and 5 are positioned on either side of a head 6 at the inner end of a rod 7, which extends through the head of the casing 3. At the outer end of the rod 7, a lever 8 is pivotally mounted at 9 and at the forward end of this lever 8 a pivot 10 is provided on which a side lever 17 is carried, which extends rearwardly therefrom and also inwardly, as shown.

At the opposite side, a like arrangement is provided, as indicated by the corresponding lever 8', pivot 9' at the end of the rod 7', side lever 17' pivotally carried by the pivot 10' at the outer end of lever 8'. Springs 18 and 18' may also be provided and connected between the respective levers 17 and 17' and 8—8', which springs tend to pull the rearwardly extending ends of the levers 17—17' inwardly, or to hold the same in the position shown.

Between the inwardly extending ends, 17a and 17b, of the side levers 17 and 17', respectively, an impact member composed of a number of separate members, indicated at 11, 11a, etc., hinged together, is carried and supported at the outer ends of the levers 8 and 8'. A cross-bar 12 extends parallel to and rearwardly of the said impact member 11, carried by the outer ends of the rods 7—7' at the pivots 9—9', as shown in Fig. 1. Between this cross-bar 12 and the impact member 11, a number of cushioning devices are provided, which may comprise telescoping members 13 and 14 attached respectively to the cross-bar 12 and impact member 11. A guide rod 15 may also be carried by the impact member 11.

The telescoping members 13 and 14 enclose a spring 16, providing an additional cushioning means between the impact member and the cross-bar, and any required number of these cushioning devices may be provided between the several individual hinged impact members and the cross-bar as may be desired.

At the inner ends of the levers 8 and 8', one end of tension springs 19 and 20, respectively, are attached, the opposite ends of said springs being attached to the shackles, 2—2', or otherwise secured to the frame of the car.

These springs, 19 and 20, are shown in Fig. 1 as being positioned one within the other, to provide a compact arrangement.

The arrangement shown in Fig. 4 is similar in construction to that just described. The cushioning means comprising the casing 3, springs 4 and 5, and rod 7 carrying the lever 8 at the pivot 9, which, in turn, carry the impact member 11, cross-bar 12, telescoping members 13 and 14 therebetween and the side lever 17, are substantially the same in construction as described heretofore, it being understood that the same construction and arrangement is provided at the opposite end of the impact member. In this modification as shown in Fig. 4, the springs 19 and 20 at the inner ends of the levers 8 and 8' are dispensed with and a cushioning device is pivotally attached at these inner ends, at 21, of the levers 8—8'. These cushioning devices comprise a casing 22 attached to the lever 8 at 21, enclosing springs 23 and 24 on opposite sides of the head 25 of a rod 26, the outer end of which rod is attached to the shackle 2, or otherwise secured to the car frame. A like cushioning device is also provided at the opposite side for the corresponding lever 8', these devices being similar in construction to the cushioning devices extending between the levers 8 and 8' at the pivot points 9 and 9', respectively, and the shackles 2—2'. These devices take up the shock in both inward and outward directions.

The operation of the device when a body is struck will be seen from the drawings. The impact member, being composed of a number of hinged sections, is very flexible and yields readily at the point of impact therewith, the outer ends of the levers 8—8' being forced inwardly by the flexing of the impact member but the movement being resisted by the springs 19 and 20, in the arrangement shown in Fig. 1, or by the cushioning device, 22, 23, 24, in the arrangement shown in Fig. 4. At the same time, the whole structure is forced rearwardly against the cushioning devices 3, 4, 5 at either end thereof and, in addition, the auxiliary cushioning device, 13, 14, at the point of impact with the impact member takes up the excessive pressure or yielding at this point, transmitting a portion of the shock therethrough directly to the cross-bar 12 and cushioning devices at either end thereof.

The side levers, 17—17', extending rearwardly from the outer ends of the impact member, protect the device against impact from the side, the transverse movement being resisted by the springs 19—20, or cushioning devices 22, 23, 24. The springs 18—18' hold the levers 17—17' in their normal position, as shown.

The flexibility and yielding in various directions provided by the construction and arrangement shown and described affords the required protection to the car in case of a collision and, in case a person is struck, the chance of serious injury, breaking of limbs, etc., is reduced, which is an important consideration and feature.

As many changes could be made in the above construction and many apparently widely different embodiments of my invention designed without departing from the spirit and scope of the invention as defined in the accompanying claims, it is to be understood that the description and drawing are intended as illustrative merely of an operative embodiment thereof.

What I claim as new and desire to secure by Letters Patent is:—

1. An automobile bumper comprising an impact member composed of a number of separate members hinged together and extending between supports at either end thereof, yielding supports mounted upon cushioning means and attached to said impact member, cushioning means carrying said supports and adapted to be attached to the frame of the automobile, and resilient means cooperative with said support adapted to normally place said impact member under tension.

2. An automobile bumper comprising an impact member composed of a number of separate members hinged together and extending between supports at either end thereof, a pair of levers each attached at one end to the ends of said impact member, separate cushioning means carried by the automobile frame and to which each of said levers is pivotally attached, and resilient members attached to the opposite end of each said levers normally holding said impact member under tension.

3. An automobile bumper comprising an impact member composed of a number of separate members hinged together and extending between supports at either end thereof, and auxiliary members extending rearwardly from the ends of the said hinged portions thereof, yielding supports mounted upon cushioning means and attached to said impact member, cushioning means carrying said supports and adapted to be attached to the frame of the automobile, and resilient means cooperative therewith adapted to normally place said impact member under tension.

4. An automobile bumper comprising an impact member composed of a number of separate members hinged together and extending between supports at either end thereof and auxiliary members extending rearwardly from the ends of the said hinged portion thereof, a pair of levers each attached at one end to the ends of the hinged portion of said impact member and auxiliary member, separate cushioning means carried by the frame of the automobile and to which each of said levers is pivotally attached, and resilient members attached to the opposite end of each of said levers normally holding said impact member under tension.

5. An automobile bumper comprising a number of separate members hinged together and extending between supports at either end thereof, yielding supports mounted upon cushioning means and attached to said impact member, a cross-bar extending parallel to and rearwardly of said impact member, cushioning means carrying said supports and cross-bar adapted to be attached to the frame of the automobile, and resilient means cooperative with said support adapted to normally place said impact member under tension.

6. An automobile bumper comprising a number of separate members hinged together and extending between supports at either end thereof, yielding supports mounted upon cushioning means and attached to said impact member, cushioning means adapted to be attached to the frame of the automobile carrying said supports, a cross-bar extending parallel to and rearwardly of said impact member and carried by said cushioning means, resilient members extending between said cross-bar and impact member, and resilient means cooperative with said supports adapted to place said impact member under tension.

7. An automobile bumper comprising an impact member composed of a number of separate members hinged together and extending between supports at either end thereof, auxiliary members extending rearwardly from the ends of the said hinged portions thereof, resilient members connected between said auxiliary members and said supports, yielding supports mounted upon cushioning means and attached to the ends of said impact member, cushioning means carrying said supports and adapted to be attached to the frame of the automobile, and resilient means associated with said supports adapted to normally place said impact member under tension.

8. An automobile bumper comprising an impact member composed of a number of separate members hinged together and extending between supports at either end thereof, a pair of levers attached at their forward ends to and providing a support for said impact member, resilient means extending from the inner ends of said levers to the frame of the automobile, cushioning means attached to the frame of the automobile and supporting said levers at their respective pivots, and auxiliary cushioning means for transmitting a part of the shock of impact directly to said cushioning means attached to the frame.

9. An automobile bumper comprising a flexible impact member composed of sections hinged together and extending across the front and rearwardly on either side, resilient means placing said impact member under tension while permitting a yielding of the several parts thereof under impact, and cushioning means comprising supports for said impact member and cooperative parts for attaching the same to the frame of the automobile.

Signed at New York, in the county of New York and State of New York, this 22d day of July, A. D. 1930.

WILLIAM A. FRANKE.